Jan. 25, 1966  O. E. ANDRUS  3,231,338
MULTI-LAYER PRESSURE VESSEL FOR HIGH
TEMPERATURE HYDROGENATION PROCESSES
Filed April 19, 1962  2 Sheets-Sheet 2

INVENTOR.
ORRIN E. ANDRUS
BY
Howard J. Barnett
ATTORNEY

United States Patent Office 3,231,338
Patented Jan. 25, 1966

3,231,338
MULTI-LAYER PRESSURE VESSEL FOR HIGH TEMPERATURE HYDROGENATION PROCESSES
Orrin E. Andrus, Shorewood, Wis., assignor, by mesne assignments, to Chicago Bridge & Iron Company, Oak Brook, Ill., a corporation of Illinois
Filed Apr. 19, 1962, Ser. No. 188,733
2 Claims. (Cl. 23—290)

This invention is directed to a multi-layer vessel for high temperature hydrogenation processes, and more particularly, to a novel inner shell liner construction to eliminate hydrogen embrittlement of the heat affected zones of the vessel wall.

In recent years, hydrogenation processes have been developed by the petrochemical and chemical industries which require very high hydrogen partial pressures, and, in addition, the processes are carried out at high temperatures. The high temperatures and pressures aggravate most noticeably the problem of hydrogen embrittlement in the heat affected zones of the process vessels, particularly in the weld regions.

Hydrogen embrittlement is caused by the dissociation of the hydrogen gas molecules present at the inner surface of the vessel wall during use of the vessel for the hydrogenation process. Due to the high pressures and temperatures experienced, the hydrogen gas molecules dissociate into hydrogen atoms which are extremely active, and migrate quite freely through most metals.

Hydrogen atoms migrating through the walls of a pressure vessel of normal carbon steel construction tend to collect and react with the carbon in the steel at the heat affected zones in the weld regions, and at any internal irregularities or inclusions, such as segregated impurities or stringy laminations, causing blistering and embrittlement of the vessel walls, and eventual failure of the vessel.

The damage is caused by the hydrogen permeating the steel and reacting to form other gases which are insoluble in the carbon steel. For example, hydrogen reacts with iron carbide in carbon steel to form methane. The methane which is thus formed cannot diffuse out of the steel, and the accumulation of methane within the steel leads to the development of high stresses which ultimately crack or blister the metal. In addition, this decarburizing removes the highly reactive iron carbides, and reduces the effective carbon content of the steel, and thereby seriously reducing its tensile strength.

The undesirable reaction of the carbides in the steel can be prevented by adding carbide-stabilizing elements such as manganese, chromium, tungsten, molybdenum, vanadium, titanium and columbium to the steel as alloys. Titanium and vanadium are particularly potent to increase the steel's resistance to hydrogen attack, and only a small quantity of these need be added. Chromium, although required in larger amounts, is less expensive, and therefore is preferably used to obtain good hydrogen resistance. However, to prevent hydrogen embrittlement by simply building the entire vessel of a chromium alloy steel is prohibitive in cost, and therefor not commercially feasible.

In the past, the practice has been to line the inside surface of the vessel with an alloy steel as shown in U.S. Patent No. 2,243,240, issued to Zerbe and assigned to a common assignee herewith. However, with the great increases in the temperatures and pressures employed for the new hydrogenation processes, even the construction shown by Zerbe is sometimes inadequate.

The extremely high hydrogen partial pressures developed in the new hydrogenation processes require a vessel construction whch will dissipate the hydrogen gas molecules before they can reach any carbon steel, especially at weld interfaces, internal grain irregularities, and at inclusions such as stringy laminations and segregated impurities.

The vessel construction of Zerbe is an early attempt to provide a "multi-layer" vessel construction combining a hydrogen resistant shell fabricated from a chrome vanadium steel and outer layers of carbon steel.

The present invention provides a novel "multi-layer" vessel inner shell construction combining an alloy steel inner shell, which is not subject to hydrogen embrittlement, and which has a carbon steel outer layer construction. This obviates the necessity for making the complete vessel wall from a chromium alloy steel, and, in addition, the construction of this invention is an improvement over the Zerbe construction, because the latter shows a continuous girth weld extending outwardly all the way from the inner shell through all the layers of the vessel. On the other hand, in the construction of the present invention, the outer surface of the inner shell is vented in such a way that the hydrogen partial pressure is reduced to a completely safe level in the carbon steel, both in the welds and in the layers of the vessel outside the inner shell.

The structure of the present invention is adequate for the recently developed hydrogenation processes, which develop temperatures in excess of 1150° F. and hydrogen partial pressures in excess of 1600 p.s.i. In this construction, the inner shell of the vessel wall, including the welds, which are exposed to excessive hydrogen partial pressures are fabricated from alloy steels which contain stable carbides, such as chromium carbides, and which do not react with hydrogen to form methane and other gases that cause hydrogen embrittlement.

The multi-layer vessel constructed in accordance with the method of the invention retains all of the construction advantages and safety features of the multi-layer construction and adds thereto the advantage of being capable of withstanding very high hydrogen partial pressures and high temperatures without being subject to hydrogen embrittlement of the strength bearing metal.

The best mode presently contemplated for carrying out the invention is illustrated in the accompanying drawings in which.

Figure 1:
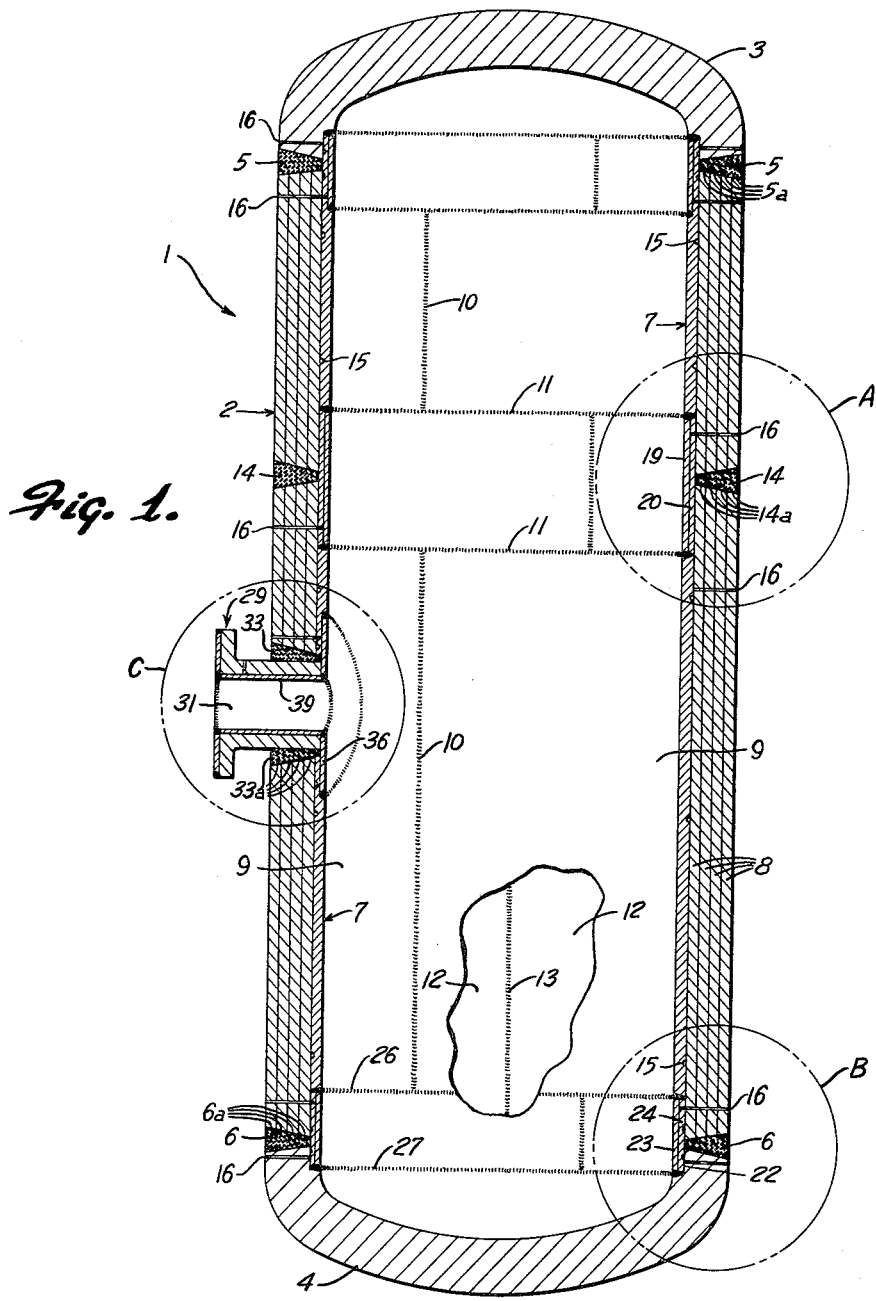
FIGURE 1 is a longitudinal section with parts broken away showing a multi-layer vessel incorporating the invention.

As shown in the drawings, the multi-layer vessel 1 comprises a body section 2 and solid end sections 3 and 4, connected together by girth welds 5 and 6, respectively. The body section 2 comprises an inner tubular shell 7 and a plurality of superimposed outer layers 8. The shell 7 is formed of a plurality of curved metal plates 9 joined together by means of longitudinal welds 10 and girth welds 11. The outer layers 8 are superimposed over the shell 7, and each outer layer 8 comprises a plurality of curved metal plates 12 joined together by means of longitudinal welds 13 and girth welds 14.

In the vessel contemplated, the shell 7 and the outer layers 8 are dissimilar metals. Specifically, the shell 7 is preferably a stainless or chromium alloy steel which does not deteriorate when subjected to hydrogen gases at high temperatures and pressures. The welds 10 and 11 in the inner shell are made to strict standards and are preferably the same steel as the shell 7.

Preferably, plates 12 of the outer layers 8 should be a metal having good tensile strength, such as carbon steel, and it is not necessary that the plates 12, the longitudinal welds 13, and the girth welds 14 be resistant to hydrogen deterioration, because the venting system to be described below effectively prevents hydrogen from collecting in the outer layers 8.

To protect the outer layers 8 from excessive pressures when a leak develops the outer surface of the shell is provided with a system of longitudinal and circumferential liner vents 15 in an interlacing network. The vents 15 communicate with a system of vents 16, which extend through all the outer layers 8 from the outer surface of the inner shell 7 to the atmosphere. Gases which pass through a leak in the shell can immediately escape through vents 15 and 16. It is also contemplated that the vents 15 could be provided on the inner surface of the first layer 8 immediately adjacent the outer surface of the inner shell 7. Further, it is possible that vents may result between the shell 7 and the first layer 8 due to irregularities in the opposed metal surfaces.

Figure 2:
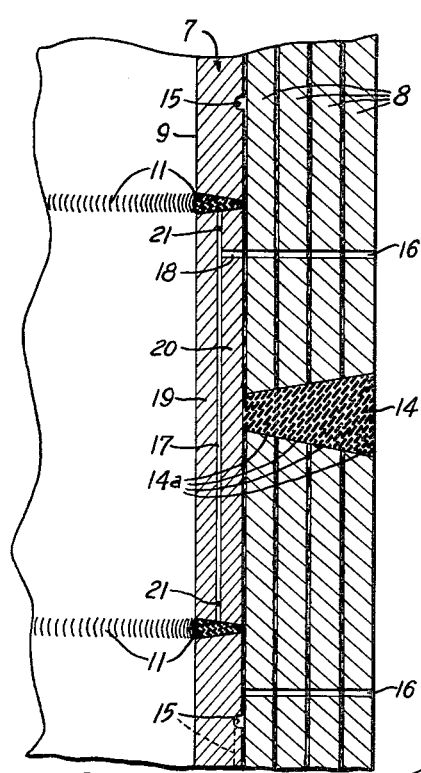
FIG. 2 is an enlarged view of the portion of the vessel indicated at A of FIGURE 1.
Figure 3:
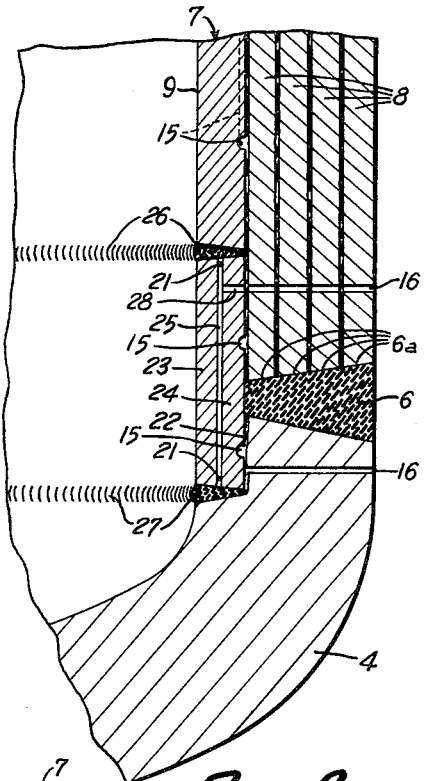
FIG. 3 is an enlarged view of the portion of the vessel indicated at B of FIGURE 1.
Figure 4:
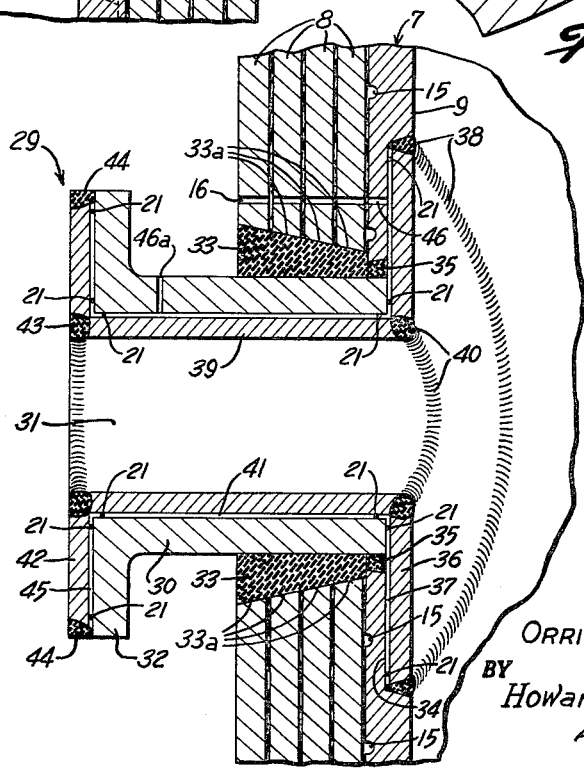
FIG. 4 is an enlarged section of the portion of the vessel indicated at C of FIGURE 1.

In general, the method of fabricating the vessel is as shown in the Stresau Patent U.S. Re. 22,251, with the exception of the inner shell 7, which is modified in accordance with the invention, and as shown in FIGS. 2, 3 and 4.

The inner shell 7 provides a complete shielding of all carbon steel girth welds 14 and their heat affected zones, such as at 14a. The longitudinal carbon steel welds 13 between curved metal plates 12 of the layers 8 outside of the shell 7 are staggered from each other to avoid having a single, longitudinal heat affected zone which is continuous through the layers. The longitudinal carbon steel welds 13 do not, therefore, require shielding, although it is possible to shield the longitudinal welds in the same way herein described.

The girth welds 14, however, are necessary if the vessel is constructed in the conventional manner, beginning with the shell 7, and wrapping the layers 8 around the shell.

To protect the weld 14 and the heat affected zones 14a from being adversely affected by hydrogen migrating through the vessel walls, an annular liner vent 17 is provided radially inward of weld 14 to divert hydrogen from the weld 14. A series of vents 18 communicate between the liner vent 17 and the vents 16, so that buildup of hydrogen partial pressures in the weld regions is avoided.

The surface vents 15 extend both longitudinally and circumferentially and interconnect with each other and with the vents 16, providing a positive venting system for the complete vessel shell 7. This venting system effectively prevents damage to the layers 8 in the event that an actual fluid leak develops in the shell 7 while the vessel is in use.

The liner vent 17 is defined by two annular curved stainless steel or chromium alloy steel strips 19 and 20 which comprise part of the shell 7. The steel strip 19 is about one half as thick as the plates 9 and is disposed to define a generally continuous curved inner surface with the plates 9. The strip 19 is welded to adjacent plates 9 along weld seams 11. The second curved stainless steel strip 20 is disposed outwardly of the strip 19, and is spaced therefrom by a spacing means such as a pair of wire bands 21, which are disposed between the strips 19 and 20. The small space between the strips 19 and 20, defines the liner vent 17. The steel strip 20 is also slightly less than about one half as thick as the plates 9, and is welded in place so that the adjacent plates 9, and the strips 19 and 20 comprise the continuous cylindrical shell 7, having smooth inner and outer surfaces. The welds 11 are usually flush with the inner and outer surfaces to further assure a completely smooth shell. The width of the strips 19 and 20 is determined by the extent of hydrogen partial pressures encountered in operation, the width being increased in direct proportion to operating pressure.

Wider strips 19 and 20 are used when the hydrogen partial pressures expected are quite high, in order to provide the most effective protection for the carbon steel girth welds 14 and the heat affected zones 14a. In this way, the hydrogen is diverted through liner vent 17, and 18, and vent 16 to the exterior before the hydrogen can build up a sufficient concentration to do any damage to the heat affected zones 14a immediately around the carbon steel girth weld 14.

The above description applies to a girth weld 14 joining together two adjacent layer sections of the body section 2 of the vessel. The protection of the girth welds 5 and 6 which connect the heads 3 and 4, respectively, to the body section 2 are modified as shown in FIG. 3, although the structure shown in FIG. 3 functions in the manner previously described.

The end sections 3 and 4 are chromium alloy or stainless steel of the same composition as the shell 7. Each end section provided with a stepped inner surface 22 to accommodate the extension of the end of the shell 7 over the inside edge of the end sections 3 and 4. The girth welds 5 and 6 are also chromium alloy or stainless steel, and have carbon steel interfaces 5a and 6a, respectively, which would ordinarily be subject to hydrogen deterioration.

As shown in FIG. 3, the end of the shell 7 comprises two superimposed annular strips 23 and 24 having a spacing means, such as wire bands 21, to space apart the strips 23 and 24 and define an annular vent 25 therebetween, similar to the structure shown in FIG. 2. The strips 23 and 24 fit into the stepped inner surface 22, of the end sections 3 and 4 and are connected thereto by end girth welds 26 and 27, respectively.

The end girth welds 26 and 27 are stainless steel or chromium alloy steel of approximately the same composition as the end sections 3 and 4. The weld 26 may extend all the way through the shell 9, or if the strip 24 is merely an extension of the shell 7, the weld 26 extends only about halfway through the shell 7, joining the strip 25 thereto.

The larger girth welds 5 and 6 which join the end sections 3 and 4 to the body section 2 are preferably bimetallic in composition in order to provide a better bond between the layers 8 and the end sections 3 and 4, respectively. As shown in FIG. 3, the outer annular strip 24 has a vent 28 which communicates between the annular vent 25 and the radial vents 16. In addition, the network of vents 15 is extended into the outer surface of the strip 24 to assure complete venting at the outside of the vessel shell 7. An additional vent 28a may be provided to communicate through the end sections 3 and 4 from the outside surface of the strip 24. This venting system effectively prevents the buildup of hydrogen partial pressures at the susceptible interfaces 5a and 6a between the girth welds 5 and 6 and the carbon steel layers 8.

The vessel 1 generally includes a closure assembly 29 which may be disposed at some point in the body section 2 of the vessel. The closure assembly 29 includes a cylindrical forging 30, defining an opening 31 which communicates with the inside of the vessel. The outer end of the forging 30 is provided with a flange 32, which provides closure attachment means. The forging 30 is carbon steel, chromium alloy, or stainless steel, and is secured to the shell by means of a deep, annular weld 33, which necessarily has heat affected zones at the weld interfaces 33a with the carbon steel layers 8. It is these zones which require protection from hydrogen embrittlement by the venting system of this invention.

As best shown in FIG. 4, the inner shell 7 has an annular, stepped portion 34 which is secured to the inner end of the cylindrical forging 30 by an annular weld 35. The annular weld 35 is preferably chromium alloy or stainless steel. A doughnut-shaped plate member 36 is disposed in the stepped portion 34 of the inner shell 7 and is spaced from the shell 7 by means of wire bands 21, or similar spacing means to define an annular vent 37 which extends in front of the annular weld 33. The plate member 36 is connected to the shell 7 by means of an annular weld 38. It is also contemplated that the stepped portion 34 of the shell 7 could be a second doughnut shaped plate member similar to the plate member 36. In this case, the weld 38 would extend all the way through the shell 7.

A tubular sleeve 39 is disposed inside the cylindrical forging 30 and is secured to the plate member 36 by means of a corner weld 40. The tubular sleeve 39 is spaced from the forging 30 by means of wire bands 21, or similar spacing means, to define a tubular vent 41.

The outer flange 32 may also be provided with an annular plate liner 42, spaced from the flange 32 by means of wire bands 21, or similar spacing means. The plate liner 42 is connected to the tubular liner 39 by means of a stainless steel or chromium alloy steel weld 43, and the outer periphery of the plate liner 42 is connected to the flange 32 by means of a weld 44. The space between the plate liner 42 and the outer flange 32 defines a second annular vent 45 which communicates with the tubular vent 41 and the first annular vent 37. The shell 7 has a vent 46 communicating between the first annular vent 37, the network of vents 15, and the vent 16 so that all hydrogen gas which penetrates the closure assembly 29 will be diverted away from the critical carbon steel-stainless steel interfaces 33a of the deep annular weld 33. An additional vent 46a can be provided in the forging 30, as shown in FIG. 4.

It is also contemplated that other constructions could be utilized to carry out the purpose of the invention, that is, to provide a multi-layer vessel having a stainless steel shell which is vented in a novel manner to prevent hydrogen embrittlement of the outer carbon steel layers and the heat affected weld zones adjacent the carbon steel layers.

The invention is directed to a multi-layer vessel having a liner comprising a hydrogen inert metal disposed between the fluid contents and the carbon steel portions and weld interfaces of the vessel which are subject to hydrogen damage. The invention provides a novel system of passageways between the vessel liner and the carbon steel portions to prevent the buildup of hydrogen pressure in these portions of the vessel, thereby insuring that hydrogen will not enter the hydrogen sensitive steels in sufficient concentrations to deteriorate the metal of the vessel wall.

Various modes of carrying out the invention are contemplated as being within the scope of the following claims particularly pointing out and distinctly claiming the subject matter which is regarded as the invention.

I claim:
1. A pressure vessel for use in chemical processes in which hydrogen gas is present in the vessel under conditions of high temperature and high pressure, comprising an outer shell fabricated from a plurality of superimposed layers of hydrogen sensitive generally curved steel plates, said outer shell having a network of vents extending therethrough to effectively prevent the buildup of damaging hydrogen pressures between the layers of the outer shell, a hydrogen sensitive girth weld joining said curved steel plates together and spaced from said vents and extending continuously from the inner layer of the outer shell to the outer layer thereof, an inner liner resistant to hydrogen embrittlement and including a first strip disposed in contact with the inner layer of the outer shell and located in radial alignment with said weld and extending a substantial distance on either side of the weld, said inner liner also including a second strip disposed radially inward of the first strip, means for spacing the first strip from the second strip to provide a clearance therebetween, said clearance being located inward of said girth weld and extending a substantial distance longitudinally of the weld, and passage means located in spaced relation to said weld for providing communication between the clearance and the network of vents for diverting atomic hydrogen away from the hydrogen sensitive weld in the outer shell and venting said hydrogen to the exterior.

2. A pressure vessel for use in chemical processes in which hydrogen gas is present in the vessel under conditions of high temperature and high pressure, comprising an outer section fabricated from a plurality of hydrogen sensitive generally curved steel plates, said outer section having a series of vents extending therethrough to prevent the buildup of damaging hydrogen pressures between the layers of the outer shell, a hydrogen sensitive girth weld joining said curved plates together and spaced from the vents and disposed at the inner surface of said outer shell, and an inner member disposed in intimate contact with the inner surface of the outer shell, and disposed inwardly of said weld and extending a substantial distance on either side of said weld, said member having a circumferentially extending hydrogen conducting passage located between the inner and outer surfaces thereof and extending in a plane generally parallel to said surfaces, said passage disposed radially inward of said girth weld and extending longitudinally on either side of the weld and communicating with said vents at a location spaced from said weld to divert the atomic hydrogen away from the hydrogen sensitive weld in the outer shell.

References Cited by the Examiner
UNITED STATES PATENTS

| | | | |
|---|---|---|---|
| 1,894,116 | 1/1933 | Pier | 196—133 |
| 2,243,240 | 5/1941 | Zerbe | 23—290 X |
| 2,772,860 | 12/1956 | Nelson. | |

MORRIS O. WOLK, *Primary Examiner.*